US007403986B1

(12) United States Patent
Li et al.

(10) Patent No.: US 7,403,986 B1
(45) Date of Patent: Jul. 22, 2008

(54) METHOD FOR SYNCHRONIZING CIRCUIT RELATED OBJECTS BETWEEN NETWORK MANAGEMENT SYSTEMS AND NETWORK CONTROL PROCESSORS

(75) Inventors: Hui-Lin Li, Sunnyvale, CA (US); Bahar E. Baran, Foster City, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 655 days.

(21) Appl. No.: 10/045,182

(22) Filed: Oct. 18, 2001

(51) Int. Cl.
  *G06F 15/173* (2006.01)
(52) U.S. Cl. .................. 709/223; 709/200; 709/230; 709/246; 709/248
(58) Field of Classification Search ............. 709/223, 709/246, 248, 220, 203, 219, 200, 230
See application file for complete search history.

(56) References Cited

U.S. PATENT DOCUMENTS

| | | | |
|---|---|---|---|
| 5,303,235 A | 4/1994 | Chan et al. | |
| 5,490,252 A * | 2/1996 | Macera et al. | 709/249 |
| 5,509,123 A | 4/1996 | Dobbins et al. | |
| 5,557,747 A * | 9/1996 | Rogers et al. | 709/223 |
| 5,566,326 A | 10/1996 | Hirsch et al. | 703/26 |
| 5,608,720 A * | 3/1997 | Biegel et al. | 370/249 |
| 5,655,081 A | 8/1997 | Bonnell et al. | |
| 5,748,617 A * | 5/1998 | McLain, Jr. | 370/244 |
| 5,764,955 A * | 6/1998 | Doolan | 709/223 |
| 5,812,843 A * | 9/1998 | Yamazaki et al. | 718/100 |
| 5,828,844 A | 10/1998 | Civanlar et al. | |
| 5,872,931 A | 2/1999 | Chivaluri | |
| 5,922,051 A | 7/1999 | Sidey | |
| 5,928,328 A | 7/1999 | Komori et al. | |
| 5,944,782 A | 8/1999 | Noble et al. | |
| 5,953,514 A * | 9/1999 | Gochee | 717/138 |
| 5,956,719 A | 9/1999 | Kudo et al. | |
| 5,991,771 A | 11/1999 | Falls et al. | |
| 6,041,350 A | 3/2000 | Takimoto | |
| 6,058,445 A | 5/2000 | Chari et al. | |
| 6,061,740 A | 5/2000 | Ferguson et al. | |
| 6,081,774 A * | 6/2000 | de Hita et al. | 704/9 |
| 6,104,868 A | 8/2000 | Peters et al. | |
| 6,119,158 A | 9/2000 | Kawagoe | |
| 6,128,656 A | 10/2000 | Matchefts et al. | |
| 6,148,402 A * | 11/2000 | Campbell | 726/10 |
| 6,185,567 B1 * | 2/2001 | Ratnaraj et al. | 707/10 |
| 6,199,173 B1 * | 3/2001 | Johnson et al. | 714/4 |
| 6,363,421 B2 * | 3/2002 | Barker et al. | 709/223 |
| 6,377,993 B1 * | 4/2002 | Brandt et al. | 709/227 |
| 6,633,977 B1 * | 10/2003 | Hamilton et al. | 713/100 |
| 6,700,890 B1 * | 3/2004 | Langley et al. | 370/395.31 |
| 6,854,010 B1 * | 2/2005 | Christian et al. | 709/223 |
| 6,880,086 B2 * | 4/2005 | Kidder et al. | 713/191 |
| 6,901,440 B1 * | 5/2005 | Bimm et al. | 709/223 |
| 7,111,053 B1 * | 9/2006 | Black et al. | 709/220 |
| 7,222,147 B1 * | 5/2007 | Black et al. | 709/200 |
| 2003/0165221 A1 * | 9/2003 | Jarvi et al. | 379/114.01 |

* cited by examiner

*Primary Examiner*—Michael Won
(74) *Attorney, Agent, or Firm*—Townsend and Townsend and Crew

(57) ABSTRACT

A method is provided for synchronizing circuit related objects between a network management system (NMS) and a network control processor (NCP). In one example, the method translates data for the circuit related objects from binary data to ASCII data in the network control processor. The ASCII is received into the network management system server from the network control processor. The ASCII data is parsed. The ASCII data is then stored in a network management system database.

17 Claims, 2 Drawing Sheets

METHOD FOR SYNCHRONIZING CIRCUIT RELATED OBJECTS BETWEEN NETWORK MANAGEMENT SYSTEMS AND NETWORK CONTROL PROCESSORS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present application is related to U.S. patent application Ser. No. 10/041,783, entitled, "SYSTEM AND METHOD TO MANAGE INCONSISTENCY PROBLEMS BETWEEN NETWORK MANAGEMENT SYSTEMS AND NETWORK ELEMENTS", filed Oct. 18, 2001, the disclosure of which is herein incorporated by reference.

FIELD OF THE INVENTION

The present invention generally relates to network management systems, more particular, to uploading circuit related objects to network management system servers.

DISCUSSION OF BACKGROUND

FIG. 1 is a diagram of a maximum number of network control processors (NCPs) that a Network Management System (NMS) can manage. An example of an NCP is a network switch. The NMS allows synchronization of one NCP at a time, for performance purposes. An NMS is required to manage a maximum network size of 10 switches. Each switch may have up to 16 k Circuits, a 12 k virtual channel connection (VCC) and a 4 k virtual path connection (VPC). These circuits may be part of Permanent Virtual Circuits (PVCs), Soft PVCs or Switched Virtual Circuits (SVCs). Each circuit is represented by multiple records (rows in an Simple Network Management Protocol (SNMP) table), which include one cross-connect record, two virtual link records (virtual channel link or virtual path link), and between one and four traffic descriptor records.

Assuming a typical average usage of two traffic descriptors for each circuit (e.g., transmit and receive), and assuming the bulk of the circuits are PVCs, the number of circuit records on an asynchronous transfer mode (ATM) switch can be 80 k. That's 16 k cross-connects plus 32 k virtual links (VLs) plus 32 k traffic descriptors. Thus, an almost worst case 10 switch network has approximately 800 k circuit records.

Typically, NMS uploads or synchronizes data by making a get request to SNMP. Once SNMP receives the request from NMS, SNMP fetches data from switch, and passes the data over to NMS.

Unfortunately, this approach does not satisfy uploading a massive number of circuits because of performance issues. Based on sample data, uploading 32 k circuits would take about 4 hours.

SUMMARY OF THE INVENTION

It has been recognized that what is needed is a way to improve performance for uploading circuit objects to an NMS server.

In one embodiment, a method is provided for synchronizing circuit related objects between a network management system (NMS) and a network control processor (NCP). The method comprises translating data for the circuit related objects from binary data to ASCII data in the network control processor; receiving into the network management system server the ASCII data from the network control processor; parsing the ASCII data; and storing the ASCII data in a network management system database.

Advantageously, performance is improved for uploading or synchronizing circuit objects between an NMS and an NCP.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention is disclosed for a method for synchronizing circuit related objects between a network management system (NMS) and a network control processor (NCP). Numerous specific details are set forth in order to provide a thorough understanding of the present invention. It will be understood, however, to one skilled in the art, that the present invention may be practiced without some or all of these specific details.

Data is retrieved via network control processor (NCP) persistence tables directly instead of using simple network management protocol (SNMP).

Figure 1:
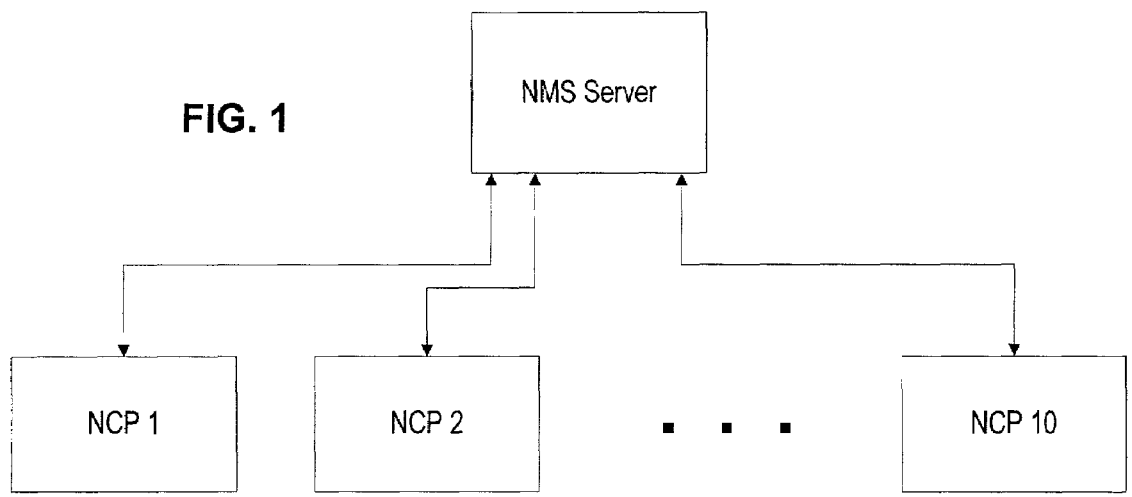
FIG. 1 is a diagram of a maximum number of switches (NCPs) that a Network Management System (NMS) can manage.
Figure 2:
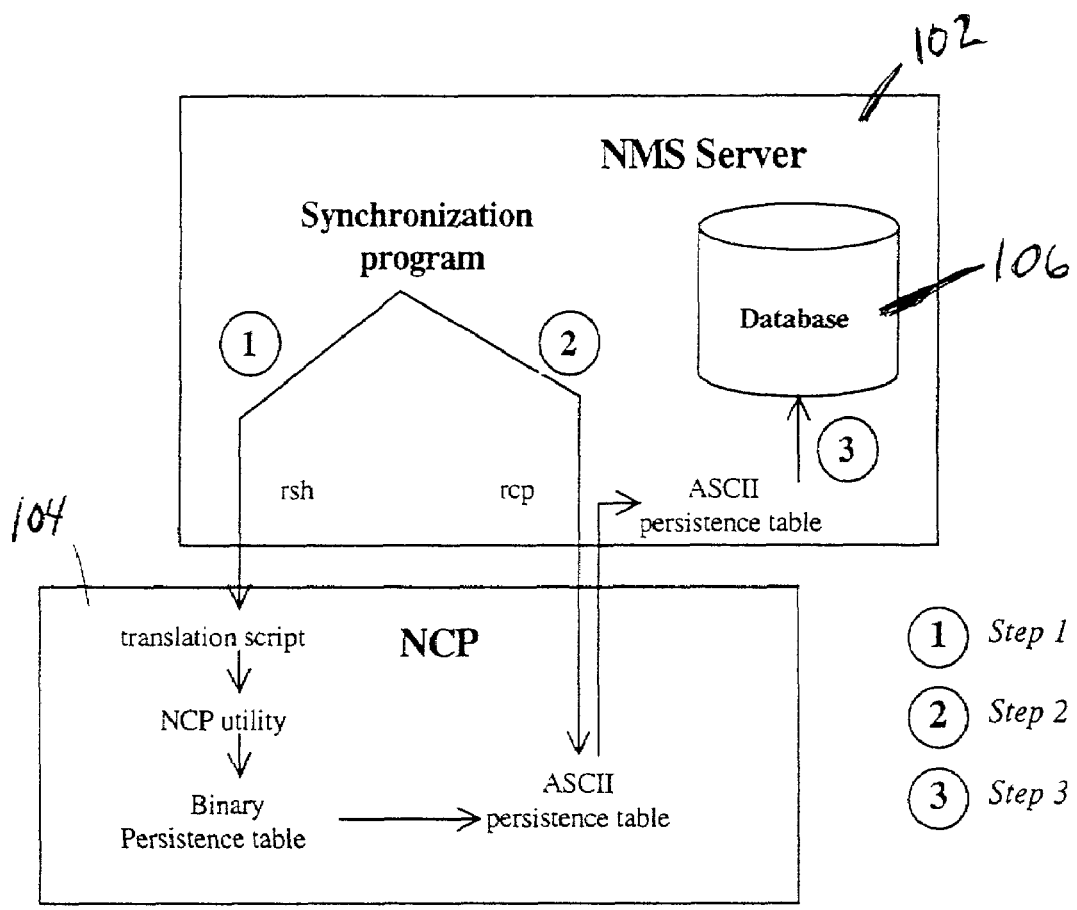
FIG. 2 is a diagram of the design for synchronizing circuit related objects between a Network Management System (NMS) and an NCP, in accordance with one embodiment of the present invention.

FIG. 2 is a diagram of the design for synchronizing circuit related objects between an Network Management System (NMS) and an NCP, in accordance with one embodiment of the present invention. Three general steps are shown for this design. However, the present invention is not limited to these specific steps nor this particular number of steps.

Step 1: Data Translation in NCP

In one embodiment, the NMS server 102 initiates a translation script in NCP using "rsh" UNIX command, which will translate a circuit related persistence table from binary to ASCII format. Persistence tables basically are binary files where data for all different types of objects get stored in the NCP 104. When users make any changes through a line operator interface (LOI) or NMS for a certain type of object, its persistence table will get updated as well. Thus, the persistence table is the place that the NMS server 102 is interested for object synchronization. Moreover, this step cannot be done in the NMS server 102 because it requires some support from NCP utilities.

Step 2: Copy Data Remotely to the NMS

Once the translation is done, the NMS server 102 will start copying the ASCII table back to the NMS server 102 via "rcp"

command. The UNIX command "rcp" performs a remote copy that allows user to copy files from a remote workstation. The accessible directory in the host machine has to have the remote machine's host name and user name in order to copy files successfully. Host machine at this point is the NCP. The remote machine is the NMS workstation.

Step 3: Parse and Store Data into NMS Database

After the remote copy operation has succeeded, the data is parsed and stored into the NMS database 106. The format of ASCII persistence table is a plain text file which maintains all available records for one type of object in NCP. At this point, what NMS needs are the circuit objects. Each record consists of a unique key, and a group of attribute names and corresponding values. The key is used to identified an individual circuit, and can be a combination of more than one attribute.

However, this format is not compatible with the one from the NMS database 106. Consequently, the parsing module of the NMS server 102 reads all records from a persistence table, parses the records to NMS desired format, and stores the records into memory. Once these steps are done, if the NMS database 106 is empty of an earlier version of the desired persistence table, the parsed records in memory are written into a formatted text file offline. A program would then issue an execution to insert data from the offline text file into the NMS database 106 directly.

On the other hand, is the NMS database 106 is not empty of an earlier version of the desired persistence table, the parsed records in memory would be compared with data from the same object table in the NMS database 106. If a mismatch occurred between two tables, the NMS database 106 would be updated accordingly.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMS, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, translating data for the circuit related objects from binary data to ASCII data in the network control processor, receiving the ASCII data from the network control processor, parsing the ASCII data, and storing the ASCII data in a network management system database, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for synchronizing circuit related objects between a network management system (NMS) and a network control processor (NCP), the method comprising:

maintaining data for circuit related objects at the network control processor;

receiving at the network control processor one or more commands from the network management system to translate the data for the circuit related objects;

translating the data for the circuit related objects from binary data to ASCII data in the network control processor in response to the commands, wherein the ASCII data comprises an ASCII persistence table;

receiving into the network management system the ASCII data from the network control processor;

parsing the ASCII persistence table at the network management system; and storing data obtained from the ASCII persistence table in a network management system database comprising one or more records relating to individual circuits for which data is maintained at the network control processor, wherein data for the circuit related objects stored in the network management system database is thereby synchronized with the data for the circuit related objects in the network control processor.

2. The method of claim 1, wherein the step of translating data comprises receiving an "rsh" UNIX command to translate data from a binary persistence table to the ASCII persistence table.

3. The method of claim 2, wherein the step of receiving the ASCII data comprises receiving an "rcp" UNIX command to copy the ASCII persistence table to a network management system database.

4. The method of claim 1, wherein an accessible directory in a host machine has a remote machine's host name and a user name, wherein the network management system is the remote machine, and wherein the network control processor is the host machine.

5. The method of claim 1, wherein the format of the ASCII persistence table is a plain text file which maintains all available records for a type of circuit related object in the network control processor, and wherein each record includes a unique key and group of names with corresponding values, and each unique key is used to identify an individual circuit.

6. The method of claim 5, wherein the step of parsing comprises:

reading all records from the ASCII persistence table; and parsing the records to an network management system desired format.

7. The method of claim 1, further comprising comparing the ASCII data with a corresponding circuit related object table already in the network management system database.

8. The method of claim 7, further comprising:
   detecting a mismatch between the ASCII data and the corresponding circuit related object table; and
   updating the network management system database accordingly.

9. A computer-readable storage medium carrying one or more sequences of one or more instructions for synchronizing circuit related objects between a network management system (NMS) and a network control processor (NCP), the one or more sequences of one or more instructions including instructions which, when executed by one or more processors, cause the one or more processors to perform the steps of:
   maintaining data for circuit related objects at the network control processor;
   receiving at the network control processor one or more commands from the network management system to translate the data for circuit related objects;
   translating the data for the circuit related objects from binary data to ASCII data in the network control processor in response to the commands, wherein the ASCII data comprises an ASCII persistence table;
   receiving into the network management system the ASCII data from the network control processor;
   parsing the ASCII persistence table at the network management system; and
   storing data obtained from the ASCII persistence table in a network management system database comprising one or more records relating to individual circuits for which data is maintained at the network control processor,
   wherein data for the circuit related objects stored in the network management system database is thereby synchronized with the data for the circuit related objects in the network control processor.

10. The computer-readable storage medium of claim 9, wherein the step of translating data comprises the processor receiving an "rsh" UNIX command to translate data from a binary persistence table to the ASCII persistence table.

11. The computer-readable storage medium of claim 10, wherein the step of receiving the ASCII data comprises the processor receiving an "rcp" UNIX command to copy, the ASCII persistence table to a network management system database.

12. The computer-readable storage medium of claim 9, wherein an accessible directory in a host machine has a remote machine's host name and a user name, wherein the network management system is the remote machine, and wherein the network control processor is the host machine.

13. The computer-readable storage medium of claim 9, wherein the format of the ASCII persistence table is a plain text file which maintains all available records for a type of circuit related object in the network control processor, and wherein each record includes a unique key and group of names with corresponding values, and each unique key is used to identify an individual circuit.

14. The computer-readable storage medium of claim 13, wherein the step of parsing causes the processor to perform the steps of:
   reading all records from the ASCII persistence table; and
   parsing the records to an network management system desired format.

15. The computer-readable storage medium of claim 9, wherein the instructions further cause the processor to perform the step of comparing the ASCII data with a corresponding circuit related object table already in the network management system database.

16. The computer-readable storage medium of claim 15, wherein the instructions further cause the processor to perform the steps of:
   detecting a mismatch between the ASCII data and the corresponding circuit related object table; and
   updating the network management system database accordingly.

17. A method for synchronizing circuit related objects between a network management system (NMS) and a network control processor (NCP), the method comprising:
   sending a command for translating data for the circuit related objects from binary data to ASCII data to the NCP, wherein the NCP translates data for the circuit related objects from binary data to ASCII data in the NCP;
   receiving into the network management system the ASCII data including an ASCII persistence table having information relating to one or more individual circuits maintained at the network control processor; and
   processing the ASCII persistence table at the network management system;
   storing data obtained from the ASCII persistence table in a network management system database, wherein a data structure in the network management system database is thereby synchronized with the data for the circuit related objects at the network control processor.

* * * * *